United States Patent

Sakuma

[11] Patent Number: 4,716,655
[45] Date of Patent: Jan. 5, 1988

[54] ORNAMENTAL COMPASS

[76] Inventor: Tadashi Sakuma, c/o Jio Goods Development Institute Kabushiki Kaisha, Suite 201 Villa-Nogizaka, 15-22, Minami-aoyama 1-chome, Minato-ku, Tokyo, Japan

[21] Appl. No.: 724,681

[22] Filed: Apr. 18, 1985

[30] Foreign Application Priority Data

Mar. 13, 1985 [JP] Japan .................. 60-34749[U]

[51] Int. Cl.$^4$ ............................................. G01C 17/10
[52] U.S. Cl. ................................................. 33/355 R
[58] Field of Search ............... 33/353, 356, 366, 364, 33/353 R; D10/68; 446/325

[56] References Cited

U.S. PATENT DOCUMENTS

| | | | |
|---|---|---|---|
| 51,290 | 12/1865 | Blunt | 33/364 |
| 487,330 | 12/1892 | Kaizer | 33/355 |
| 1,961,068 | 5/1934 | Mix | 33/355 |
| 2,027,952 | 1/1936 | Bandoly | 33/355 |
| 2,114,054 | 4/1938 | Kormann | 33/355 |
| 3,402,929 | 9/1968 | Glass et al. | 446/325 X |
| 3,613,251 | 10/1971 | Fitzpatrick et al. | 33/355 X |

FOREIGN PATENT DOCUMENTS

| | | | |
|---|---|---|---|
| 488052 | 12/1929 | Fed. Rep. of Germany | 446/325 |
| 702237 | 2/1941 | Fed. Rep. of Germany | 33/355 |
| 1096705 | 1/1961 | Fed. Rep. of Germany | 33/364 |
| 0032811 | 2/1984 | Japan | 33/355 R |
| 76087 | 1/1950 | Norway | 33/364 |

Primary Examiner—Harry N. Haroian
Attorney, Agent, or Firm—Wenderoth, Lind & Ponack

[57] ABSTRACT

An ornamental compass comprises an ornament such as a doll or car. The ornament is attached to a direction-adjustable means which makes the ornament easy to be adjusted and pointed in right direction. The direction-adjustable means is connected to a magnet. The magnet is powerful enough to make the ornament, direction-adjustable means, and magnet point in a direction. A rotatable means for supporting the ornament, direction-adjustable means, and magnet fluctuate in any direction, which fluctuation gives the ornament an interesting movement.

3 Claims, 3 Drawing Figures

ORNAMENTAL COMPASS

BACKGROUND OF THE INVENTION

1. Field of the Invention

The invention relates generally to a compass and particularly to a dry compass. More particularly, it relates to a compass which is used as an ornament as well.

2. Description of the Prior Art

Ordinary compasses comprise just a bar magnet and a gage plate as a dry type compass or comprise a gage sphere having a magnet therein which is put in liquid as the liquid type compass. Since the liquid type compass has problems such as chemical corrosion by the liquid and thermal expansion, the present invention is the dry type.

In the dry type, there is a PCT patent application in Japan, the application number of which is JP84/00389, and the inventer of which is the same one as that of the present invention.

The prior art is a dry type compass comprising a cubic molding such as a toy car, a gage plate showing directions and a map, and a pair of magnets one of which is a low-powered magnet which is attached to the cubic mold and the other of which is a high-powered magnet which is mounted outside of the cubic mold.

Since the construction of the dry type compass has the compass needle mounted on a pin type support, it is very difficult to adjust the center of the gravity of the needle.

Even if it can be adjusted perfectly, its north side will go down in the Northern Hemisphere and its south side will go down in the Southern Hemisphere because of the magnetism of the Poles of the earth.

Of course, since mass and weight of ordinary compasses are small and light, it is not a big problem though it is clumsy. However, it will be a big problem, if the compass is used as an ornament.

A compass having a pair of magnets as described in the prior art is high in price and will not fluctuate. Thus, this prior art compass will not show interesting motions. Also, the other compasses will not fluctuate either.

The prior art compasses have the same problem with regard to the direction in which the compass needle points since the position of the north Pole and the South Pole of the earth is a little bit different from the positions to which prior art compasses point to.

BRIEF SUMMARY OF THE INVENTION

It is an object of the present invention to provide a compass which can be used as an ornament as well.

It is another object of the present invention to provide a compass which can be easily adjusted in direction.

It is a further object of the present invention to provide a compass which can be easily adjusted to tilt.

A further object of the present invention is to provide a compass which has an ornament which will fluctuate as if it is walking, running or dancing.

The ornamental compass of the present invention is an ornament as well. The ornament is attached to a direction-adjustable means. The direction-adjustable means is connected to a magnet. The magnet is powerful enough to make the ornament, direction-adjustable means, and magnet point in the right direction. Also, rotatable supporting means for supporting the ornament, direction-adjustable means and magnet fluctuate in any direction.

For a better understanding of the invention, its operation, its advantage, and specific objects attained by its use, reference should be had to the accompanying drawings and descriptive matter in which there is illustrated and described the preferred embodiment of the present invention. It should be understood that any change within the scope of the claims may be included in the invention without departing from the spirit of the invention or sacrificing any advantage thereof.

DESCRIPTION OF THE PREFERRED EMBODIMENT

Figure 1:
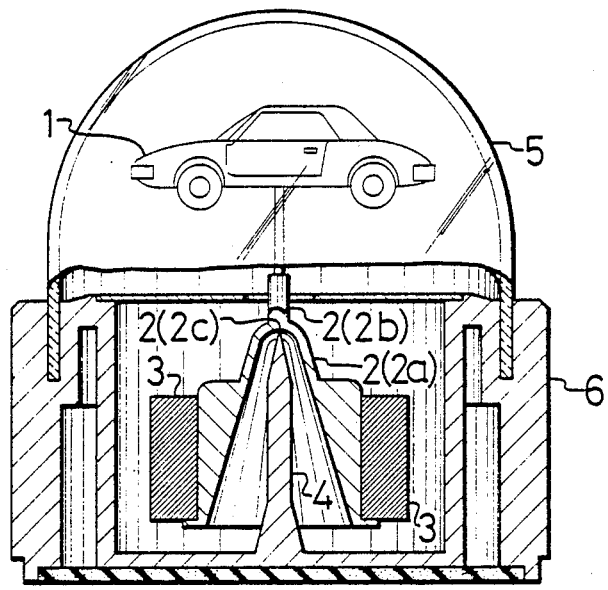
FIG. 1 is a side view of an ornamental compass of a preferred embodiment of the present invention, a part of which is omitted.

A preferred embodiment of the present invention will now be described by reference to the accompanying drawings.

An ornamental compass comprises an ornament 1 such as a doll or car disposed within a clear cover 5 above a housing 6. The ornament 1 is attached to a direction-adjustable means 2 within the housing 6. This direction-adjustable means 2 makes it easy so that the ornament may be adjusted and pointed in the right direction. The direction-adjustable means 2 is connected to a magnet 3. The magnet 3 is powerful enough to make the ornament 1, direction-adjustable means 2, and magnet 3 point in a certain direction. A rotatable supporting means 4 for supporting the ornament 1, direction-adjustable means 2, and magnet 3 allows them to fluctuate in any direction. The rotatable supporting means 4 and the direction-adjustable means 2 in this embodiment are constructed as follows.

Figure 2:
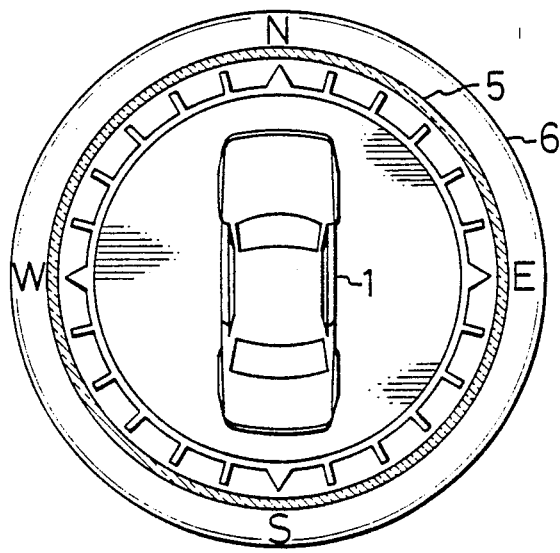
FIG. 2 is a plane view of the ornamental compass, the transparent cover of which is omitted.

The direction-adjustable means 2 comprises a cap-shaped holder 2a which holds the magnet 3 and which has a pin 2b on the top thereof for projecting the ornament 1 above the housing 6 into the cover 5 for viewing purposes. The inside top part 2c of the cap-shaped holder 2a is placed on the tip of the rotatable supporting means 4 as shown in FIGS. 1 and 2. Thereby, it gives the ornament 1 an interesting movement.

Thus, the ornamental compass, comprises a housing having a hollow interior and an opening through an upper portion of the housing, support means formed integrally with a lower portion of the housing, the support means extending towards the opening and having a tip end of reduced cross-section below the opening, a direction-adjustable means being disposed within the housing and supported on the support means for rotation in any direction, the housing having a conical recess extending upwardly from a bottom surface thereof, the tip end of the support means contacting an upper surface of the recess formed in the direction-adjustable means whereby the direction-adjustable means may pivot freely on the support means, an annular one-piece magnet supported on and extending completely around a radially outer periphery of the direction-adjustable means, an ornament disposed above the housing, connection means extending through the opening and connecting the ornament to the direction-adjustable means for supporting the ornament above the housing and allowing the ornament to easily tilt in any direction, and covering means fixed to the housing and enclosing the ornament for maintaining the ornament in a dry condition and for allowing viewing of the direction and fluctuating movement of the ornament.

The ornament 1 is a cubic or three-dimensional molding such as a child-shaped or animal-shaped doll fluctuating as if the doll is walking or dancing, or it is a vehicle or animal-shaped doll fluctuating as if it is running. The ornament 1 is arranged over said magnet 3 and direction-adjustable means 2 as shown in FIG. 1. Of course, it is possible to place the ornament 1 under said magnet 3 and direction-adjustable means 4 in case of the ornament 1 is a marionnet.

Figure 3:
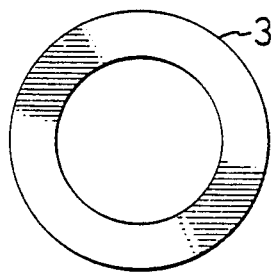
FIG. 3 is a plane view of the magnet of the ornamental compass.

Said direction-adjustable means 2 is adjustable when said ornament 1 is atached thereto. It is also possible to adjust it even after said ornament 1 has been attached thereto. Although the magnet 3 forms a ring as shown in FIG. 3 in this embodiment, it is also possible to employ a bar magnet or horseshoe magnet.

I claim:

1. An ornamental compass, comprising:
    a housing having a hollow interior and an opening through an upper portion of said housing and a compass rose around said opening;
    support means formed integrally with a lower portion of said housing, said support means extending towards said opening and having a tip end of reduced cross-section below said opening;
    a direction-adjustable means being disposed within said housing and supported on said support means for rotation in any direction, said direction-adjustable means having a conical recess extending upwardly from a bottom surface thereof, said tip end of said support means contacting an upper surface of said recess formed in said direction-adjustable means whereby said direction-adjustable means may pivot freely on said support means;
    an annular one-piece magnet supported on and extending completely around a radially outer periphery of said direction-adjustable means;
    an ornament disposed above the housing;
    connection means extending through said opening and connecting said ornament to said direction-adjustable means for supporting said ornament above said housing and allowing said ornament to easily tilt in any direction and for cooperating with said compass rose; and
    covering means fixed to said housing and enclosing said ornament for maintaining said ornament in a dry condition and for allowing viewing of the direction and fluctuating movement of said ornament.

2. The ornamental compass according to claim 1, wherein said ornament is a cubic molding.

3. The ornamental compass according to claim 1, wherein said ornament is shaped as a vehicle.

* * * * *